Patented July 27, 1954

2,684,945

UNITED STATES PATENT OFFICE 2,684,945

N.AMYL PHENYL ORTHOSILICATES

Ettore Da Fano, Raritan, N. J., assignor to John B. Pierce Foundation, New York, N. Y., a corporation of New York No Drawing. Application May 17, 1952, Serial No. 288,548

1 Claim. (Cl. 252—78)

This invention relates to novel compositions of mixed n.amyl-phenyl orthosilicates, particularly useful as fluid heat transfer mediums.

This application is a continuation-in-part of copending application, Serial No. 44,617, filed August 17, 1948, now abandoned.

The production of an efficient heat transfer medium operable over a wide range of temperatures, rendering it useful both as a cooling and heating medium, has long been sought after. Many individual compounds and mixtures thereof have been suggested and used but have proved partially or totally ineffective. Several organic liquids, such as petroleum products, chlorinated oils, aryl silicates, and eutectic mixtures of diphenyl and diphenyl oxide have been utilized heretofore for transferring heat at elevated temperatures. However, these liquids are ineffective at low temperatures due to the fact that the aforesaid eutectic mixtures are solid at room temperature, and the other named organic liquids become very viscous at low temperature. Similarly other heat transfer mediums operable at sub-zero temperatures have low boiling points, rendering them inoperable at high temperatures. Consequently, it is evident that the operable temperature ranges for known heat transfer liquids have been limited to either the low temperatures or the high temperatures. No single liquid has been found having a temperature range inclusive of both the sub-zero and the elevated temperatures, although such a wide versatile temperature range is particularly useful under all climatic conditions, inclusive of arctic climates.

The tetra-alkyl orthosilicates leave something to be desired as heat transfer mediums over a wide temperature range. Although the lower alkyl silicates, inclusive of the amyls, are fluid enough at low temperatures, they possess low boiling points, rendering them useless at high temperatures. The higher alkyl silicates, beginning with the hexyl group, have sufficiently high enough boiling points, but exhibit high viscosities at sub-zero temperatures, rendering them insufficiently fluid for proper utilization at low temperatures. Furthermore, the heat stability of these higher alkyl orthosilicates is only mediocre, some decomposition occurring at elevated temperatures.

The tetra-aryl orthosilicates have been utilized as heat transfer mediums as disclosed by the patent to Johnston, 2,335,012. Whereas these aryl silicates possess good heat stability and high boiling points, their viscosities at low temperature are even greater than those of the higher alkyl silicates described above. Some of the tetra-aryl orthosilicates are even solids at temperatures above room temperature, as clearly disclosed by the aforesaid Johnston patent, wherein the melting point of tetra-phenyl orthosilicate is described as 48° C. This high melting point of the aryl silicates limits their use as heat transfer mediums for high temperature operations only. Another disadvantage of these aryl silicates is their tendency to resinify if kept at elevated temperatures over a period of time. Johnston has attempted to overcome this inherent defect by using mixtures of tetra-aryl orthosilicates with each other or with other compatible organic silicates such as tetra-ethyl orthosilicate. Johnston alleges that these mixtures are not only more heat stable, that is resistant against resinification and decomposition, but also remain liquid at room temperature, thereby widening the operable temperature range of these heat transfer mediums. However, the silicate mixtures defined in the Johnston patent do not have a satisfactory temperature range including sub-zero temperatures.

Accordingly, it is an object of this invention to provide a composition useful as a heat transfer medium over a wide temperature range inclusive of the sub-zero temperatures as well as the elevated temperatures.

Another object of this invention is to provide a heat transfer medium which retains its fluidity over the entire temperature range.

Still another object of the invention is the development of a liquid composition having a high initial boiling point.

Another object of the invention is the obtention of a liquid heat transfer medium having a sub-zero crystallization or melting point.

Still another object of the invention is to provide a composition having a low viscosity over the entire temperature range to which it is subjected.

Another object of this invention is the obtention of a composition possessing heat stability.

It has now been found that a disproportionation mixture of n.amyl-phenyl orthosilicates containing from one to three n.amyl radicals to from three to one phenyl radicals has the desired fluidity and low viscosity over a wide and versatile temperature range including both the sub-zero and the elevated temperatures, is heat stable, has a high initial boiling point and a sub-zero crystallization or melting point. The above attributes render the aforementioned composition particularly suitable as heat transfer media in varied climatic conditions, inclusive of arctic climates.

In accordance with this invention novel heat transfer fluid compositions comprising primarily a mixture of tri-n.amyl-phenyl orthosilicate, di-n.amyl diphenyl orthosilicate and n.amyl-triphenyl orthosilicate are prepared possessing an operating range of from about −65° to about 525–600° F. and a freezing or crystallizing point of below about −100° F. The low viscosity exhibited by the aforesaid heat transfer composition renders said liquid manipulative at −65° F. in a heat transfer system. Another beneficial result of the low viscosity of the aforesaid mixture of amyl-phenyl silicates is the manifestation of good heat transfer ability over the entire operating range rendering these compositions suitable both as heating and cooling media.

After an extensive study of many individual compounds selected from the groups of alkyl, aryl and alkyl-amyl orthosilicates, it was found that:

1. In order to obtain a wide temperature range heat transfer media, the orthosilicates containing the lower alkyl radicals and the lower aryl radicals (phenyl and tolyl) are preferable due to the higher viscosity characteristics imparted by the higher alkyl and aryl radicals.

2. The phenyl radical exhibits higher heat stability than other aryl radicals such as the substituted phenyl radicals, although the monosubstituted, i. e., the tolyl radicals are less objectionable and for many practical purposes may be regarded as the equivalent of the phenyl radical.

3. The methyl radical is less desirable because of the known toxicity of methyl silicate.

4. The propyl radical imparts poorer heat stability to the orthosilicate compound at 400–500° F., thereby rendering it less desirable in imparting the desired properties to the orthosilicate.

5. The hexyl and higher alkyl radicals impart a high viscosity to the compounds rendering them less suitable at low temperatures.

6. Of the remaining alkyl radicals, the n.amyl radical exhibited the unusual property of an extremely low viscosity as clearly shown in Table I. This unusual characteristic is contrary to expected results. Since it is known that the boiling points of a homologous series of alkyl-aryl orthosilicates increase with the molecular weight of the alkyl group, it would be expected that the viscosities likewise increase. However, the n.amyl-phenyl orthosilicate possesses the lowest viscosity of all the other lower boiling point alkyl-aryl orthosilicates.

Table I

| Compound | Boiling Point at 760 mm. | Viscosity at 25° C. |
|---|---|---|
|  | ° F. | Centistokes |
| Ethyl-triphenyl orthosilicate | 709 | 7.1 |
| n.amyl triphenyl orthosilicate | 745 | 5.7 |
| i-amyl triphenyl orthosilicate | 747 | 7.4 |

The iso-amyl-phenyl orthosilicates per se or mixtures thereof also failed to exhibit as desirable viscosity properties as shown above. In addition, the branched chain amyl-phenyl orthosilicates show instability to heat forming on heating a volatile hydrocarbon gas of a characteristic ethylenic odor accompanied by polymerization of the residue.

The n.amyl-phenyl orthosilicates exhibited better heat stability than any of the other alkyl-aryl silicates, as well as desirable viscosity properties.

To further substantiate the unique position of the n.amyl-phenyl orthosilicates in this respect, namely, the unusual combination of a high boiling point and a low viscosity, a comparative study of boiling points and viscosities of a great number of known organic compounds was made. The results of this study showed that no prior art compound having as high a boiling point as the n.amyl-phenyl orthosilicates, also had such a low viscosity, especially at low temperatures. This unusual property exhibited by the n.amyl-phenyl orthosilicates renders these compounds particularly suitable as heat transfer media over a wide and versatile temperature range.

The pure n.amyl-phenyl orthosilicates can be separated by careful distillation under vacuum and their properties measured before there is an opportunity for disproportionation. The essential characteristics are clearly shown in Table II hereinbelow:

Table II

| Properties | Triamyl-phenyl ortho-silicate | Diamyl-diphenyl ortho-silicate | Amyl-triphenyl ortho-silicate |
|---|---|---|---|
| Molecular weight | 382.62 | 388.58 | 394.54 |
| Density at 25° C | 0.890 | 0.944 | 0.986 |
| Boiling point at 10 mm. ° F | 365 | 388 | 455 |
| Boiling point at 766 mm. ° F | 622 | 662 | 745 |
| Kin viscosity, centistokes: |  |  |  |
| at 37.8° C | 2.6 | 3.1 | 4.3 |
| at 25° C | 3.4 | 3.9 | 5.7 |
| at −35° C | 23.4 | 34.9 | 73.4 |
| at −50° C | 60.0 | 95.5 | 252.0 |

The mixture of n.amyl-phenyl orthosilicates may be prepared by reacting n.amyl alcohol and phenol with silicon tetrachloride. The mechanism of the reaction is best illustrated by the following equation:

$$n(ROH) + SiCl_4 + (4-n)(R'OH) \rightarrow (RO)_nSi(OR')_{4-n} + 4HCl$$

wherein R represents the n.amyl radical, R' represents the phenyl radical and $n$ is any number from 0.75 to 3.25.

The utilization of an excess of n.amyl alcohol and phenol is preferable in order to ensure the reaction of substantially all the SiCl₄. The silicon tetrachloride is added to the mixture of phenol and alcohol with agitation. After all of the silicon tetrachloride has been added, the reaction mixture is heated to drive off the residual hydrogen chloride by-product, and the excess phenol and amyl alcohol are removed by distillation.

By varying the proportions of the reactants, varying amounts of all of the following three monomers are obtained:

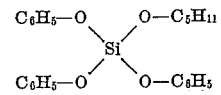

2. Di-n.amyl di-phenyl silicate:

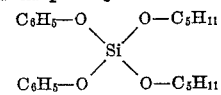

and

3. Tri-n.amyl phenyl silicate:

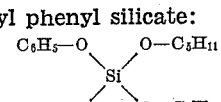

In addition smaller amounts of tetra-n.amyl silicate and tetra-phenyl silicate will be present. My invention comprises a mixture of all five silicates, the mixed silicates predominating, which is referred to herein as a disproportionation mixture. The proportions of each compound depends on the value of $n$.

It has been found that during the synthesis of the mixture of n.amyl-phenyl orthosilicates, some of the amyl alcohol tends to react with the hydrogen chloride formed during the reaction to produce water which causes partial hydrolysis and polymerization. Consequently, the crude reaction product contains some comparatively viscous silicate polymer in addition to a mixture of the three aforementioned monomers. This crude reaction product, which is slightly more viscous than the mixture of monomers is also capable of acting as a heat transfer medium where low viscosity at −65° F. is not essential and easy pumpability down to −40° F. is sufficient. However, when the heat transfer medium is to be used at lower temperatures, the crude reaction product requires distillation in order to separate the monomers from the polymer.

Another method of preparing the compositions of the present invention entails the transesterification or disproportionation of a mixture of tetra-n.amyl orthosilicate and tetra phenyl orthosilicate at elevated temperatures in a ratio of 3.25–0.75 to 0.75–3.25 of the reactants. The n.amyl and the phenyl radicals interchange during this heating period until an equilibrium is set up between the three silicate monomers. The addition of a catalyst facilitates the completion of the reaction.

The following compositions, which are disproportionation mixtures fall within the invention and are illlustrative:

*Table III*

| Gram Radical Weights | | | Viscosity at 77° F. | Boiling Point |
|---|---|---|---|---|
| n.Amyl | Phenyl | Silicate | | |
| 13 | 3 | 4 | 3.3 | 525° F. |
| 12 | 4 | 4 | 3.4 | 550° F. |
| 10 | 6 | 4 | 3.6 | 575° F. |
| 8 | 8 | 4 | 3.9 | 590° F. |
| 5 | 11 | 4 | 4.9 | 610° F. |
| 4 | 12 | 4 | 5.7 | 670° F. |
| 3 | 13 | 4 | 6.4 | above 675° F. |

The following examples are illustrative of these novel disproportionation mixtures of n.amyl-phenyl orthosilicates and their preparation, and it will be understood that the invention is not limited thereto:

*Example I*

A reaction vessel was charged with 1 mol of n.amyl alcohol and 3 mols of phenol. The reaction vessel was equipped with a mechanical agitator and could be heated or cooled at will. It was provided with a condenser system suitable for both reflux and distillation, as well as an alcohol trap to absorb and react with any entrained silicon tetrachloride. The reaction vessel was also provided with a suitable drying tower leading to the atmosphere to prevent moisture from entering the reaction chamber.

After charging the mixture of the alcohol and phenol to the reaction vessel, the mixture is agitated and the condenser connected with reflux to the acid absorber through the alcohol trap which contains 10% excess of the total combined weights of the alcohol and phenol, and the drying towers are adjusted so that no moisture can enter the system.

The reaction vessel is cooled to about 15° C., at which point the silicon tetrachloride is added at such a rate that the temperature does not exceed 45° C. The first portion of the reaction is highly exothermic and the addition of the silicon tetrachloride takes some time depending upon the cooling facilities. After 1 mol of silicon tetrachloride has been added, the reaction system is brought to room temperature and gradually heated to a temperature of about 145° C. to expel hydrogen chloride. The reaction mixture is then allowed to reflux for several hours.

The condenser is then arranged for distillation and any unreacted materials are stripped off and the reaction mixture cooled. If desired, excess alcohol and phenol in the same proportions may be added and refluxed and then stripped off.

After the reaction is complete, the reaction mixture is washed with water until the water phase is neutral and the liquid then dried and filtered. The resultant silicate is a clear liquid of pleasing odor, which is obtained in yield approaching theoretical.

The liquid has an initial boiling point (by the capillary method) of 670° F. and is a clear fluid down as low as −70° F. It has a viscosity of 2.85 centistokes at 200° F., 14.0 centistokes at 77° F., and 760 centistokes at −40° F. If lower viscosities are desired, and especially in cases where lowest possible viscosity at −65° F. is essential, the crude products are distilled under reduced pressure in order to eliminate polymeric by-products. After distillation at 10 mm. mercury up to a temperature of 270° C., the distillate, which was separated from polymers, had a viscosity of 1.66 centistokes at 200° F., 5.7 centistokes at 77° F., 95.3 centistokes at −40° F., and 300 centistokes at −65° F.

*Example 2*

Following the same general procedure as Example 1, but employing 2 mols of n.amyl alcohol and 2 mols of phenol, a product is obtained having a boiling point of 590° F. The viscosity is 1.95 centistokes at 200° F., 7.0 centistokes at 77° F., and 245 centistokes at −40° F. After distillation at 10 mm. mercury up to a temperature of 270° C., the distillate, which was separated from polymers, had a viscosity of 1.40 centistokes at 200° F., 3.9 centistokes at 77° F., 52 centistokes at −40° F., and 148 centistokes at −65° F.

*Example 3*

Following the same general procedure as in Example 1, the reaction mixture is prepared utilizing 1 mol of silicon tetrachloride, 3 mols of n.amyl alcohol and 1 mol of phenol. The product has a boiling point of 550° F. and a viscosity of 1.9 centistokes at 200° F., 6.5 centistokes at 77° F., and 158 centistokes at −40° F. After distillation at 10 mm. mercury up to a temperature of 270° C., the distillate, which was separated from polymers, had a viscosity of 1.25 centistokes at 200° F., 3.4 centistokes at 77° F., 30.5 centistokes at −40° F., and 77 centistokes at −65° F.

In preparing the compositions by the second alternative method, the same general procedure is followed except that only n.amyl alcohol is used in preparing the tetra-n.amyl orthosilicate and only phenol is used in preparing the tetra-phenyl silicate. The amounts of the pure n.amyl and phenyl orthosilicates to give the desired proportion are mixed together and permitted to transesterify or disproportionate. The reaction is slow in the absence of a catalyst but is more rapid under reflux conditions, especially if the last trace of chloro-silicates formed during the reaction are not removed until after the disproportionation is complete. The chloro-silicates act as disproportionation catalysts and can be removed later by washing with water or by treatment with sodium or an alcoholate.

The expression "disproportionation mixture" is used herein to refer to the mixture whether obtained by disproportionation of the two silicates as described above or by reaction with the alcohol and phenol in amounts to give the same mixture. The expression refers to the nature of the mixture and not to the method by which it is made.

While the invention has been described with reference to specific embodiments, it will be apparent to those skilled in the art that various modifications may be made and equivalents substituted therefor without departing from the principles and true nature of the present invention.

I claim:

Fluid heat transfer composition consisting essentially of a mixture of minor amounts of tetraphenyl orthosilicate and tetra-n.amyl orthosilicate and major amounts of n.amyl triphenyl orthosilicate, di-n.amyl di-phenyl orthosilicate, and tri-n.amyl phenyl orthosilicate, the phenyl and the n.amyl radicals in all of the compounds of said mixture being in the proportion of from 0.75 to 3.25 phenyl radicals to from 3.25 to 0.75 n.amyl radicals for each silicon atom, said composition having excellent heat stability, an operating temperature range of about −65° F. to 525–600° F., a freezing point of below about −100° F., and a relatively low viscosity over the entire operating range.

References Cited in the file of this patent

UNITED STATES PATENTS

| Number | Name | Date |
|---|---|---|
| 2,335,012 | Johnston | Nov. 23, 1943 |
| 2,566,365 | Pedlow et al. | Sept. 4, 1951 |